(12) United States Patent
Lefeuvre et al.

(10) Patent No.: US 6,847,021 B2
(45) Date of Patent: Jan. 25, 2005

(54) DEVICE FOR REHEATING BY MICROWAVES

(75) Inventors: Serge Lefeuvre, Amsterdam (NL);
Pieter Moret, Amsterdam (NL);
Hendrikus Bauke De Boer,
Amsterdam (NL); Dirk Johan Peter Out, Amsterdam (NL)

(73) Assignee: Unilever Bestfoods North America, Division of Conopco Inc., Englewood Cliffs, NJ (US)

( * ) Notice: Subject to any disclaimer, the term of this patent is extended or adjusted under 35 U.S.C. 154(b) by 0 days.

(21) Appl. No.: 10/257,109

(22) PCT Filed: Apr. 10, 2001

(86) PCT No.: PCT/NL01/00284

§ 371 (c)(1),
(2), (4) Date: Mar. 20, 2003

(87) PCT Pub. No.: WO01/78459

PCT Pub. Date: Oct. 18, 2001

(65) Prior Publication Data

US 2003/0160047 A1 Aug. 28, 2003

(30) Foreign Application Priority Data

Apr. 10, 2000 (EP) .............................................. 00201275

(51) Int. Cl.$^7$ ................................................ H05B 6/80
(52) U.S. Cl. ...................................... 219/730; 219/678
(58) Field of Search ................................. 219/678, 725, 219/730, 733, 734, 735, 756, 759, 762

(56) References Cited

U.S. PATENT DOCUMENTS

| | | | | |
|---|---|---|---|---|
| 4,450,334 A | | 5/1984 | Bowen et al. | ......... 219/10.55 E |
| 4,663,506 A | | 5/1987 | Bowen et al. | ......... 219/10.55 E |
| 4,728,762 A | | 3/1988 | Roth et al. | ............ 219/10.55 E |
| 5,310,977 A | * | 5/1994 | Stenkamp et al. | .......... 219/730 |
| 6,307,193 B1 | * | 10/2001 | Toole | .......................... 219/735 |
| 6,414,290 B1 | * | 7/2002 | Cole et al. | ................... 219/759 |
| 6,627,862 B1 | * | 9/2003 | Pedersen | ..................... 219/730 |

FOREIGN PATENT DOCUMENTS

| | | |
|---|---|---|
| JP | 10056981 | 3/1998 |
| JP | 10085130 | 4/1998 |

* cited by examiner

*Primary Examiner*—Thor Campbell
(74) *Attorney, Agent, or Firm*—Morgan Lewis & Bockius LLP

(57) ABSTRACT

Device for reheating baked microwaveable food products comprising: i) an external container (1) composed of a lower part (2) and a removable lid (3) fitting to the lower part (2), all being made of a heat resistant mineral composition that is transparent for microwaves; ii) a sheet (6) susceptible to microwave heating, which sheet (6) is positioned above the bottom (8) of container and spaced from the bottom (8) by supports (9) creating a heat insulating interspace between the bottom (8) and the sheet (6); iii) in the top of the device just below lid (3) but separated therefrom a sheet (11) susceptible to microwave heating; iv) in sheet (11) opening for microwave heating.

15 Claims, 2 Drawing Sheets

DEVICE FOR REHEATING BY MICROWAVES

The invention relates to a device for microwave heating according to the preamble of claim 1.

Nowadays food products, including baked bakery products become more and more popular as components of the daily meal. These products are made in a form that makes them readily available for the retail trade and/or consumer and all the retailer/consumer needs to do is to reheat the food product prior to consumption. This reheating should be achievable in the shortest time possible. For this microwave techniques are available these days. An example is shown in U.S. Pat. No. 4,728,762 A disclosing a microwave heating device having a lower container in which a support for food products to be processed is arranged. A microwave absorber converts microwave energy from a microwave oven in heat which is transferred to the product carrier to heat the product. U.S. Pat. No. 4,663,506A from which the preamble of claim 1 is known, discloses a microwave-cooking vessel having a container with a lid. Botch the container and the lid are provided with inserts being provided with layers of microwave energy absorbing material.

However, it appeared that microwave reheating is not always so easy and easily results in products that are overheated, in particular locally overheated so that local burned spots are present in or on the food products after the reheating. If the treatment is changed to prevent overheating, sufficient heating in particular of the core of the food product can no longer be obtained. Also the crispness of the products obtained by these known techniques is not always the crispness that is desired. Therefore these products are not appreciated by the retailers/consumers and consequently the invention aims to provide a solution so that reheated food products can be prepared in a short time using microwave energy but which products do not display the disadvantages of the products made by the known techniques. Moreover it is aimed to provide a device that is reusable and that does not need to be discarded after use as is the case for known devices (e.g. such as known from U.S. Pat. No. 4,190,757A).

Moreover the device according to the invention should be removable from the oven without giving problems because of the high temperature of the device (about 280° C.) leaving the MW-oven. The invention also aims to improve the heating efficiency of the device and of the microwave heating.

This aim is realized with the characterizing features of claim 1.

Surprisingly it has been found that by arranging openings in the sheet and more particular, the upper sheet sufficient heating of the core of the food product can be guaranteed whilst on the other hand no burning of the outer layers of the food products is present.

The size and shape of the openings depend on the product for which the device is most likely to be used.

According to a preferred embodiment of the invention the holes should have a circumference of at least 30 mm. According to a further preferred embodiment this minimum circumference should be at least 50 mm.

The openings can be circular in which case the diameter should be at least 10, 16 mm respectively.

According to a further preferred embodiment of the invention the openings are elongated having a smallest size from 1 mm and more.

It has been found that through the use of holes except from better heating of the core relative to the outer layers of the product the loss of moisture from the outer layers of the product into the surrounding atmosphere decreases sharply meaning that a better prepared product is obtained. Further preferred embodiments of the invention are given in the subclaims.

The invention will be further elucidated referring to the drawings, wherein.

Figure 1:
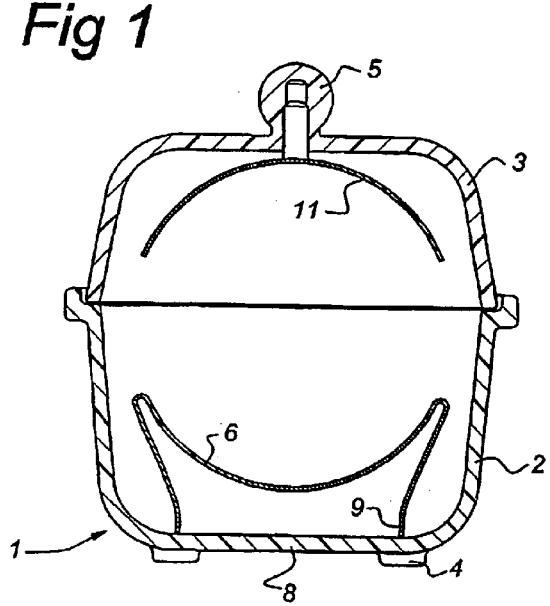
FIG. 1 shows a first embodiment of the device according to the invention in cross-section.

In FIG. 1 an elongated device for reheating by microwaves is shown in cross-section. It comprises an external container 1 having a lower part 2 and an upper part or removable lid 3. A heat insulation grip 5 is provided to remove lid 3 from lower part 2. The container is made from a material that is transparent to microwaves such that if such a container is placed in a microwave oven microwaves can penetrate the container and can be used for reheating the product inside container 1, without heating the container itself.

Such a product (not shown) should be positioned on sheet 6 having support feet 9. The interspace provided by feet 9 results in a heat barrier between the bottom 8 and sheet or susceptor 6. Sheet 6 is arranged to generate heat from microwave energy from the microwave oven in which container 1 is placed. This means that there is heat at the sheet and not at the bottom 8 of lower part 2 of container 1. Because of that after reheating the product it is possible to remove the container from the microwave oven and place it on a table or the like without the risk of burning.

Lid 3 of container 1 is provided with a sheet or susceptor 11. This sheet is also produced from a material absorbing microwave radiation and converting it to heat which heat is subsequently radiated to the food product present in the container. Sheet 11 should not be in direct contact with lid 3 as this will avoid that lid 3 will become very hot, i.e. will reach temperatures of above 300° C.

The material from which the susceptors 6 and 11 can be made, can be selected from any material known to be susceptible to microwave heating with the prerequisite that the materials are food allowable. A convenient material is the product resulting from the heating of a metal powder and a mineral clay (as a support therefore and providing physical strength after baking of the clay) and wherein this metal powder is incorporated. Aluminum powder is preferably used therefore.

The susceptor material sheets 6 respectively 11 are according to another embodiment of the invention suitably made from a metal sheet provided with a coating of a material susceptible to microwave heating at that surface of the sheets 6 respectively 11 facing the container 1 respectively the lid 3, the coating in particular being a ferrite containing material. The heat developed by the susceptors 6 and 11 is transferred to the metal sheet by conduction and the heat produced by these sheets is used to reheat the food products.

Beneficial results are obtained when sheet 6 and/of sheet 11 is/are provided at the side facing the container 1 respectively the lid 3 with a layer of material that forms a heat barrier, this material not being susceptible to microwave heating comprises e.g. foamed glass. However other barrier materials can be used as well. These barrier materials give a more efficient use of the heat produced because less of the heat will be lost from the system.

Figure 2:
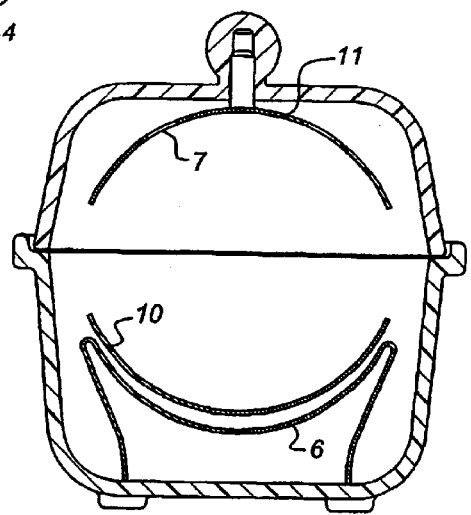
FIG. 2 shows a second embodiment of the device according to the invention.

In FIG. 2 a further embodiment of the device according to the invention is shown. In this embodiment on sheet 6 a carrier 10 is arranged. Such carrier 10 is removable and supports the food product. Such a carrier is useful to avoid that the lower part 2 of the container 1 should be cleaned after every time it is used. In this embodiment only carrier 10 has to be cleaned.

In the embodiment of FIG. 2 sheet 11 is provided with holes 7 forming a pattern for faster microwave heating of the core of the food product in carrier 10. The holes help to focus the microwave energy in those parts of the food product to be reheated where this is desired. Such holes can also be provided in sheet 6.

If circular these holes have a diameter being larger than 10 mm and more particular larger than 16 mm. If elongate the sizes circumference should be at least 30 mm and more preferably at least 50 mm.

Figure 3:
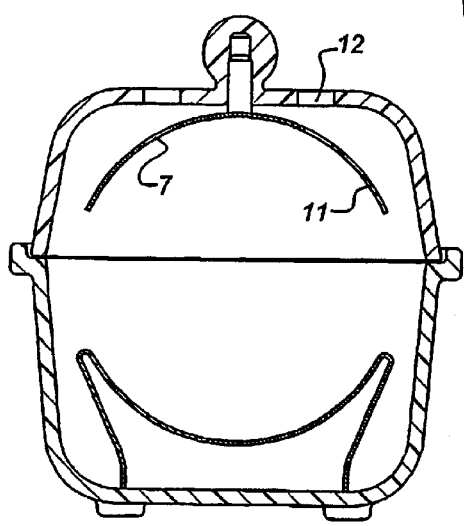
FIG. 3 shows a third embodiment of the device according to the invention.

FIG. 3 shows an embodiment without a carrier 10 but having a sheet 11 provided with openings 7. Preferably, sheet 6 and/of 11 both in this embodiment and in the previous embodiments having a shape following the contour of the product to be reheated. In this way a more homogeneous heating of the product to be reheated is possible.

Figure 4A:
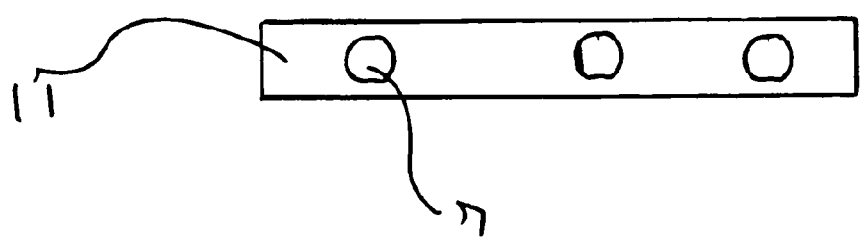
FIGS. 4a and 4b illustrate features of the device of the invention.
Figure 4B:
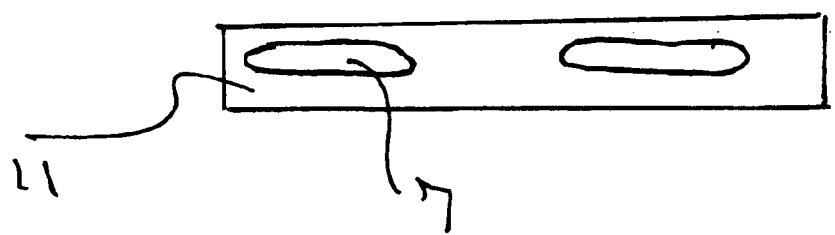

FIGS. 4a and 4b illustrate embodiments according to the invention wherein sheet (11) is provided with, respectively, circular holes (7) or elongated holes (7).

By using a material that can reflect infrared waves at either the innerside of lid 3 or at the innerside of bottom 8 it can be prevented that heat losses occur while simultaneously the temperature of the container and/of the lid do not become to high. This results in a better quality of the products. Such materials are well known and any of these materials that is a food allowable material can be used in the device of the invention.

A further improvement can be achieved by using a black coating on the side of sheet 11 or of sheet 6 facing the product in the device, this coating will improve the radiation efficiency of these sheets and results in a better crispness after reheating.

During the reheating water vapor will be formed and it is suitable to remove this water vapor in a controlled way. This can be achieved by providing holes 12 in the container 1 in particular in its lid 3.

The materials from which the device of the invention is made are such that the device is reusable for a great number of times. This has ecological and economical advantages.

Although the invention has been shown above referring to three preferred embodiments it will be immediately clear for a person skilled in the art that various combinations can be made and further adaptations can be introduced without leaving the scope of protection of the appended claims.

What is claimed is:

1. A device for microwave-reheating of baked bakery products comprising:
   an external container (1) composed of a lower part (2) and a removable lid (3) fitting to the lower part (2), all being made of a heat resistant mineral composition that is transparent for microwaves;
   a first sheet (6) susceptible to microwave heating, which sheet (6) is positioned above the bottom (8) of container (1) and spaced from the bottom (8) by supports (9) creating a heat insulating interspace between the bottom (8) and the sheet (6); and
   positioned within lid (3) adjacent the top thereof, but separated therefrom, a second sheet (11) susceptible to microwave heating, the sheets (6) and (11) being made of a metal and being provided with holes (7) forming a pattern for a faster microwave heating of the food product, all of the components of said device comprising materials which enable the repeated use of said device.

2. Device according to claim 1 wherein said holes (7) have a circumference of at least 30 mm.

3. Device according to claim 2, wherein said holes (7) have a circumference of at least 50 mm.

4. Device according to claim 2, wherein said holes (7) are circular or elongated.

5. A device according to claim 1, wherein the sheets (6) and (11) are made from a metal sheet provided with a coating of a ferrite-containing material susceptible to microwave heating at the surface of the sheets (6) and (11) facing the food product.

6. Device according to claim 1, wherein the lid (3) is provided with heat insulated grips (5) for removal of the hot lid (3) from the lower part (2) of the container (1).

7. Device according to claim 1, wherein the lid (3) is provided at its innerside with a material reflecting infrared waves.

8. Device according to claim 1, wherein sheet (11) at the side facing the product in the device is provided with a black coating to improve the radiation efficiency of sheet (11) and to increase the crispness of the product after microwave reheating.

9. Device according to claim 1, wherein the bottom (8) of container (1) is provided at its innerside with a coating of a material reflecting infrared waves.

10. Device according to claim 1, wherein the lid (3) of external container (1) is provided with holes (12) to remove the water vapor formed during the reheating of the baked bakery-products.

11. Device according to claim 1, wherein the lower part (2) is provided with support means (4).

12. A device for microwave-reheating of baked bakery products comprising: an external container (1) composed of a lower part (2) and a removable lid (3) fitting to the lower part (2), all being made of a heat resistant mineral composition that is transparent for microwaves; a sheet (6) susceptible to microwave heating, which sheet (6) is positioned above the bottom (8) of container (1) and spaced from the bottom (8) by supports (9) creating a heat insulating interspace between the bottom (8) and the sheet (6); positioned within lid (3) adjacent the top thereof but separated therefrom, a sheet (11) susceptible to microwave heating. wherein the sheets (6) and/or (11) is/are made of a metal and is/are provided with holes (7) forming a pattern for a faster microwave heating of the food product, said device also comprising a carrier (10) for the food product to be heated by microwave heating and made from a material not transparent for microwaves, said carrier being in direct heat exchange contact with sheet (6).

13. Device according to claim 12, wherein the carrier (10) is absent while the sheet (6) has a shape following the contour of the product to be reheated in the device.

14. A device for microwave-reheating of baked bakery products comprising: an external container (1) composed of a tower part (2) and a removable lid (3) fitting to the lower part (2), all being made of a heat resistant mineral composition that is transparent for microwaves; a sheet (6) susceptible to microwave heating, which sheet (6) is positioned above the bottom (8) of container (1) and spaced from the bottom (8) by supports (9) creating a heat insulating interspace between the bottom (8) and the sheet (6); positioned within lid (3) adjacent the top thereof but separated therefrom, a sheet (11) susceptible to microwave heating, wherein the sheets (6) and/or (11) is/are made of a metal and is/are provided with holes (7) forming a pattern for a faster microwave heating of the food product, wherein the sheets (6) respectively (11) is/are made of a material obtained by heating a metal powder with a mineral clay.

15. A device for microwave-reheating of baked bakery products comprising: an external container (1) composed of a lower part (2) and a removable lid (3) fitting to the lower part (2), all being made of a heat resistant mineral composition that is transparent for microwaves; a sheet (6) susceptible to microwave heating, which sheet (6) is positioned above the bottom (8) of container (1) and spaced from the bottom (8) by supports (9) creating a heat insulating interspace between the bottom (8) and the sheet (6); positioned within lid (3) adjacent the top thereof but separated therefrom, a sheet (11) susceptible to microwave heating, wherein the sheets (6) and/or (11) is/are made of a metal and is/are provided with holes (7) forming a pattern for a faster microwave heating of the food product wherein sheet (6) and sheet (11) are provided at the side facing the container (1) and lid (3), respectively, with a layer of material that forms a heat barrier.

* * * * *